(12) United States Patent
Dezonno

(10) Patent No.: US 7,562,052 B2
(45) Date of Patent: Jul. 14, 2009

(54) SECURE CUSTOMER COMMUNICATION METHOD AND SYSTEM

(76) Inventor: Tony Dezonno, 233 Pinewood La., Bloomingdale, IL (US) 60108

( * ) Notice: Subject to any disclaimer, the term of this patent is extended or adjusted under 35 U.S.C. 154(b) by 0 days.

(21) Appl. No.: 10/862,286

(22) Filed: Jun. 7, 2004

(65) Prior Publication Data

US 2005/0273443 A1 Dec. 8, 2005

(51) Int. Cl.
*G06Q 99/00* (2006.01)
(52) U.S. Cl. .................. 705/71; 380/30; 380/255; 380/150; 713/168; 709/203; 709/245; 709/236
(58) Field of Classification Search ............ 380/30, 380/255, 150; 705/75; 713/168, 153; 709/203, 709/245, 236
See application file for complete search history.

(56) References Cited

U.S. PATENT DOCUMENTS

| | | | | |
|---|---|---|---|---|
| 4,405,829 | A * | 9/1983 | Rivest et al. ................ 380/30 |
| 5,555,179 | A | 9/1996 | Koyama et al. |
| 5,765,033 | A | 6/1998 | Miloslavsky |
| 5,926,539 | A | 7/1999 | Shtivelman |
| 5,946,387 | A | 8/1999 | Miloslavsky |
| 5,953,332 | A | 9/1999 | Miloslavsky |
| 5,953,405 | A | 9/1999 | Miloslavsky |
| 6,002,760 | A | 12/1999 | Gisby |
| 6,021,428 | A | 2/2000 | Miloslavsky |
| 6,044,145 | A | 3/2000 | Kelly et al. |
| 6,044,368 | A | 3/2000 | Powers |
| 6,067,357 | A | 5/2000 | Kishinsky et al. |
| 6,108,711 | A | 8/2000 | Beck et al. |
| 6,138,139 | A | 10/2000 | Beck et al. |
| 6,167,395 | A | 12/2000 | Beck et al. |
| 6,170,011 | B1 | 1/2001 | Beck et al. |
| 6,175,563 | B1 | 1/2001 | Miloslavsky |
| 6,175,564 | B1 | 1/2001 | Miloslavsky et al. |
| 6,185,292 | B1 | 2/2001 | Miloslavsky |
| 6,307,938 | B1 | 10/2001 | Matyas, Jr. et al. |
| 6,345,098 | B1 | 2/2002 | Matyas, Jr. et al. |
| 6,345,305 | B1 | 2/2002 | Beck et al. |
| 6,373,836 | B1 | 4/2002 | Deryugin et al. |
| 6,389,007 | B1 | 5/2002 | Shenkman et al. |
| 6,393,015 | B1 | 5/2002 | Shtivelman |
| 6,732,156 | B2 | 5/2004 | Miloslavsky |
| 6,836,765 | B1 * | 12/2004 | Sussman ................ 705/75 |
| 2001/0036267 | A1 | 11/2001 | Paillier |
| 2003/0065919 | A1 * | 4/2003 | Albert et al. ............. 713/168 |
| 2004/0062390 | A1 | 4/2004 | Slavin |

OTHER PUBLICATIONS

Athanasiou, Tom; Encryption: technology, privacy and national security. (confidentiality of electronic communication), Aug.-Sep. 1986, Technology Review, vol. 89, p. 56(10).*

* cited by examiner

*Primary Examiner*—James P Trammell
*Assistant Examiner*—Behrang Badii
(74) *Attorney, Agent, or Firm*—Husch Blackwell Sanders Welsh & Katz

(57) ABSTRACT

The method for creating communication encryption keys for use over a communications channel comprises the steps of: selecting a code number for a user or web browser; selecting the two highest prime numbers, excluding 1 and the code number itself, in the code number; determining if each of these prime numbers is greater than the square root of the code number; and, if so, establishing with a web server two communication encryption keys equal to the two highest prime numbers.

6 Claims, 3 Drawing Sheets

| Customer Identifier | Customer Account Code (e.g., Telephone No.) | No. of Factors | Factors - Prime Numbers | Sq. Root |
|---|---|---|---|---|
| 3272 | 2278057 | 2 | 191 11927 | 1509.3 |
| 3273 | 2278058 | 6 | 2 23 46 49523 99046 1139029 | 1509.3 |
| 3274 | 2278059 | 10 | 3 7 21 49 147 15497 46491 108479 325437 759353 | 1509.3 |
| 3275 | 2278060 | 10 | 2 4 5 10 20 113903 227806 455612 569515 1139030 | 1509.3 |
| 3276 | 2278061 | 2 | 149 15289 | 1509.3 |
| 3277 | 2278062 | 22 | 2 3 6 9 18 38 57 114 171 342 6661 13322 19983 39966 59949 119898 126559 253118 379677 759354 | 1509.3 |
| 3278 | 2278063 | 0 | 1139031 | 1509.3 |
| 3279 | 2278064 | 18 | 2 4 8 16 176 346 692 623 1384 1646 2768 3292 6584 13168 142379 284758 569516 1139032 | 1509.3 |
| 3280 | 2278065 | 6 | 3 5 15 151871 455613 759355 | 1509.3 |
| 3281 | 2278066 | 30 | 2 7 14 29 31 58 62 181 203 217 362 406 434 899 1267 1798 2534 5249 5611 6293 10498 11222 12586 36743 39277 7386 78554 162719 325438 1139033 | 1509.3 |
| 3282 | 2278067 | 10 | 11 67 121 281 737 3091 8107 18827 34001 207097 | 1509.3 |
| 3283 | 2278068 | 46 | 2 3 4 6 12 13 17 26 34 39 51 52 68 78 102 156 204 221 442 663 659 884 1326 1718 2577 2652 3436 5154 10308 11167 14603 22334 29206 33501 43809 44668 58412 67002 87618 134004 175236 189839 379678 569517 759356 1139034 | 1509.3 |
| 3284 | 2278069 | 0 | 0 | 1509.3 |
| 3285 | 2278070 | 14 | 2 5 10 157 314 785 1451 1570 2902 7255 14510 227807 455614 1139035 | 1509.3 |
| 3286 | 2278071 | 14 | 3 9 27 139 417 607 1251 1821 3753 5463 16389 84373 253119 759357 | 1509.3 |
| 3287 | 2278072 | 6 | 2 4 8 284759 569518 1139036 | 1509.3 |
| 3288 | 2278073 | 2 | 7 325439 | 1509.3 |
| 3289 | 2278074 | 6 | 2 3 6 379679 759358 1139037 | 1509.3 |
| 3290 | 2278075 | 10 | 5 25 293 311 1465 1555 7325 7775 91123 455615 | 1509.3 |

*FIG. 3*

SECURE CUSTOMER COMMUNICATION METHOD AND SYSTEM

BACKGROUND OF THE INVENTION

1. Field of the Invention

The present invention relates generally to encoding methods and more particularly to methods for achieving secure communications in electronic commerce transactions.

2. Description of the Related Art

Secure communication is vital for the commercial success of electronic commerce transactions. Modern Internet commerce is predicated on the assumption that sensitive financial and personal information can be encrypted to prevent unauthorized disclosure over the common network. Typically, this is done using a standard of encryption known as "HTTPS" or Hyper Text Transfer Protocol Secure. The HTTPS protocol is selected to run on the company web server as a measure to insure that communication with a user or web browser is secured through encryption of information sent over the channel. This standard communicates information that is encrypted and decrypted at both a sender and receiver using assigned keys between both the sender and receiver. The administration of these keys is typically done through a central depository company such as that provided by RSA Security to manage the distribution of security channel keys.

It is well known that prime numbers are used as keys in electronic communications in various encryption standards. Two prime numbers multiplied together create a composite number of which only two factors are the two prime numbers. Both prime numbers can then become keys of an encrypted message in methods such as the RSA algorithm. Encryption length key standards today are 1024 bits, but it is expected that this encryption size will increase as memory and processor speeds increase to produce larger length keys. Security of the transaction, however, is predicated on the assumption that the channel of communication is secure.

In the event of a compromise of the secure HTTPS channel, little protection is available to the end user, as in a web transaction with a company, to securely exchange information with the company. Without the security of the communications channel, sending financial information such as credit card information can result in the unintended disclosure of the information to others.

Previous solutions used rely on the use of a single standards based communications method. In such solutions, when a solution to the encoding algorithm becomes publicly known, the electronic communications session can become vulnerable to attack or fraud. Another popular solution technique is to increase key size whenever the algorithm for a key code is uncovered.

Some U.S. Patents disclosing prior cryptography techniques are:

| PATENT | PATENTEE |
| --- | --- |
| 3,962,539 | Ehrsam et al. |
| 4,200,770 | Hellman et al. |
| 4,218,582 | Hellman et al. |
| 4,405,829 | Rivest et al. |
| 4,748,668 | Shamir et al. |
| 4,850,017 | Matyas et al. |
| 5,140,634 | Guillou et al. |
| 5,214,703 | Lai et al. |
| 5,231,668 | Kravitz |
| 5,315,658 | Micali |

BRIEF SUMMARY

In one embodiment of the present invention, a method is provided for establishing a secure channel or level of security during an Internet transaction when it is discovered that the security of the channel has been breached (i.e. is no longer secure). In this way, a user/browser can continue to communicate with a server, e.g., a bank; with a level of security namely customer encoding security is invoked.

In another embodiment of the present invention there is provided a method for creating customer communication encryption keys for use over a communications channel comprising the steps of: selecting a code number; selecting the two highest prime numbers, excluding 1 and the code number itself, in the code number; determining if each of these prime numbers is greater than the square root of the code number; and, if so, establishing with a web server the two communication encryption keys.

In yet another embodiment of the present invention there is provided a method for adding customer encoding on a communication channel between a user and a web server when the security of the communications channel is determined to be breached or compromised comprising the steps of: establishing a customer encoding system using an encryption method between a user or web browser/user and a web server; the customer encoding further including establishing a user name and using the customer code for establishing two (2) communication keys for the encryption method, the communication encryption keys being defined by the largest two (2) prime numbers of the customer account code; determining if the security on the communications channel has been compromised or breached; determining if the user wishes to continue; communicating between the user/browser and web server that additional customer encoding is to be used in further communications on the communication channel; prompting the user or web browser to present the user name; prompting the user for the customer account code; storing the customer account code on the user's machine and on the web server; creating communication keys; and, continuing transfer of customer encoded messages on the communications channel until communication is completed.

BRIEF DESCRIPTION OF THE SEVERAL VIEWS OF THE DRAWINGS

The invention, together with the advantages thereof, may be understood by reference to the following description in conjunction with the accompanying figures, which illustrate some embodiments of the invention.

FIG. 3 is a table of one example of customer encoding including customer identifier or user name, customer account code (telephone number), number of factors, the prime number factors and the square root of the account number or account code.

DETAILED DESCRIPTION

Figure 1:
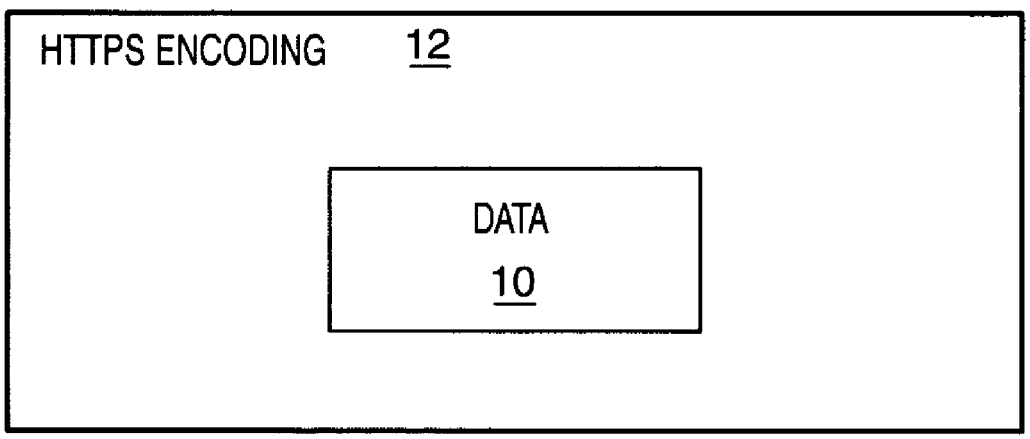
FIG. 1 is a block diagram of the standard prior art encryption of customer data using HTTPS (Hyper Text Transfer Protocol Secure).

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

RSA is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browsers from Microsoft and Netscape. It's also part of Lotus Notes, Intuit's Quicken, and many other products. RSA Security owns rights to this particular encryption system. The company licenses the algorithm technologies and also sells development kits. The technologies are part of existing or proposed Web, Internet, and computing standards.

The mathematical details of the algorithm used in obtaining the public and private keys are available at the RSA Web site. Briefly, the algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if a party wishes to send a message, he can find out the public key of the receiving party (but not the private key) from a central administrator and encrypt a message to the receiving party using his public key. When the encrypted message is received, it is decrypted with the private key of the receiving party. In addition to encrypting messages (which ensures privacy), one can authenticate themselves to the receiving party (so the receiving party can know who really sent the message) by using their private key to encrypt a digital certificate. When the digital certificate is received by the receiving party, they can use the senders public key to decrypt it.

One example of the prior art encapsulation or super imposition of customer encoding of data inside of an HTTPS message is shown in FIG. 1, where the data is designated 10 and the HTTPS is designated 12. The illustrated embodiment of FIG. 1 utilizes a pre-established protocol between the user, customer or web browser and the server using customer account information or encoding which the user and server have pre-established.

Figure 2:
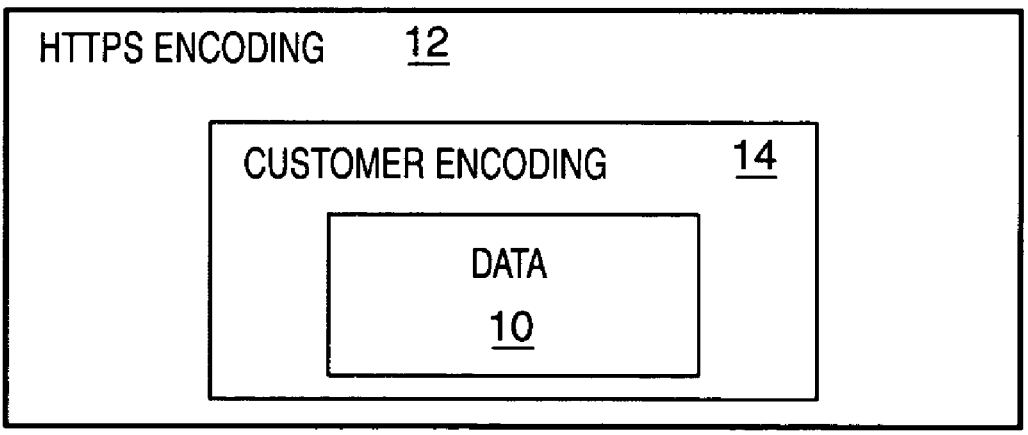
FIG. 2 is a block diagram showing standard encryption of customer data using HTTPS (Hyper Text Transfer Protocol Secure) and including customer encoding of the data according to one embodiment of the present invention.

In the absence of the secure channel, a customer encoding may be implemented with a customer encoding 14 as shown in the illustrated embodiment of FIG. 2 and may include the customer user name and selected customer account information, such as an account code or telephone number to perform a secondary encryption of information normally expected to be carried over a secured channel. In the absence of the secure channel, the user may be prompted to enter the account information into the user or web browser application for the process of generating communications encryption keys known to both the user/customer and the server/bank.

Upon identification of the consumer to the web server with a public identity, the web user is then prompted to enter a specific identifying code over a secure channel like HTTPS. In the event that the secure channel is detected as being unavailable, the user is given the option to send the information as an encrypted session using the user account key as the challenge response. As the account code is known both by the web site (server) and the user, consumer or web browser, this is a common key method and the recovering web server decodes the information from the user using the account code for the user as the handle of the encryption. Consequently, an additional encapsulation specific to customer data can be deployed for each and every different customer, making decoding more difficult in a hostile environment.

The user name may be the customer's user name and the customer account code can be the customer's telephone number. To create the encryption keys in one embodiment, the system determines the two largest prime numbers of the customer account code, namely, the customer's telephone number and the large prime numbers are selected to be greater than the square root of the telephone number. These two prime numbers are then used with an encryption method such as RSA (the Rivest, Shamir and Adleman crypto system), PGP (Pretty Good Privacy) encryption system or DES (Data Encryption Standard Algorithm)).

Another benefit in this environment is that the key does not need to be exchanged between the parties over the public network as both can use the key to code the message to be sent. Although a common identifying key, such as a telephone number, is used, this code need not be used directly as the code for the encryption system. Through using the telephone number as an account example, an additional 22 bits of encryption strength can be applied to the encoding of messages in the communication path by doing an additional encoding based on the customer specific information.

FIG. 3 is an example of a table containing columns of: a customer identifier (e.g., a customer ID number or a user name); a customer account code; here the customer's telephone number; the number of factors in the telephone number; the factors some of which are prime numbers, as well as the square root of the customer account code.

In selecting the common key, although the account information like a telephone number is directly known to the user and the company, it is preferable to have a method for generating the most appropriate key from this data to be communicated, rather than require that the data is the key itself. The key is agreed upon prior to the HTTPS fault or during the public information session, although it is worthy to have the key choice secret to prevent possible interpretation. As such in a preferred embodiment, the largest prime factors in the factor list are used as the keys for the communication. Furthermore, only the prime factors that are larger than the square root (sqrt column shown) of the common information are used as candidates for the key selection to further increase the robustness of encryption. Also, when the customer information is prime (2 factors) or a composite number (more than 2 factors), it is desirable to select an agreed variation of the customer information such as the next higher number not meeting this condition as the agreed upon common information between the user and the web server. Alternatively, an agreed upon algorithm can be applied to the account number.

Figure 4:
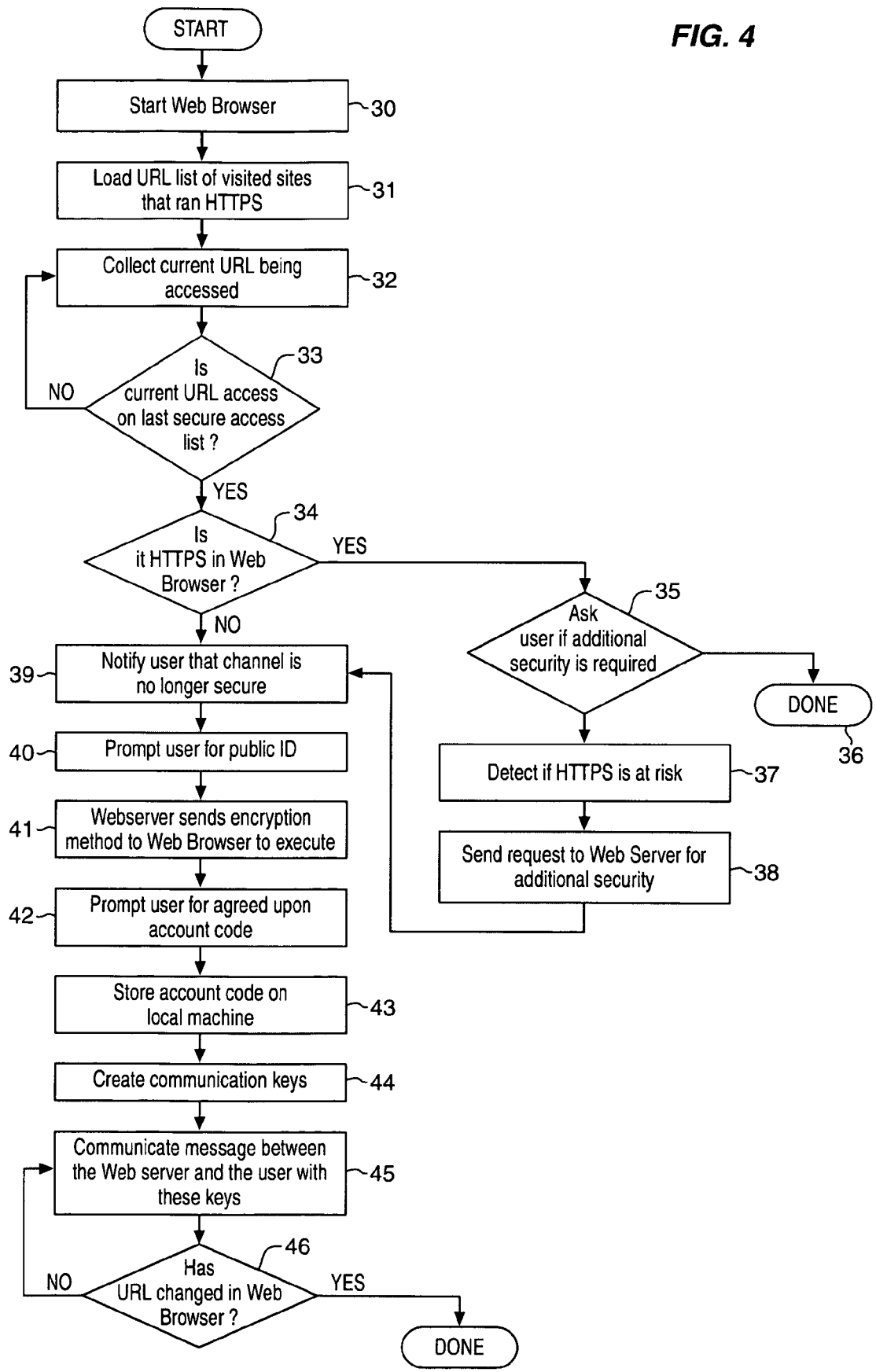
FIG. 4 is a flow chart of one embodiment of the steps performed in using the customer encoding.

A flow chart illustrating one embodiment of a method for carrying out the encoding is shown in FIG. 4. After starting the web browser as illustrated at block 30 the user loads the URL list of visited sites that ran HTTPS and then collects the current URL being accessed as shown at 31, 32. Next, a determination is made at block 33 as to whether the current URL being accessed is on the last secure access list. In other words, is the security HTTPS for this channel from a user to a web server (such as a bank site) secure or has it been breached?

Subsequently, a determination is made as to whether the HTTPS that has been breached is the HTTPS in your web browser illustrated at block 34. If the answer is yes, the user is queried as to whether additional security is desired as shown at block 35. Here the user can elect to terminate the session or determine if HTTPS is at risk and if so, send a request to the web server/bank for additional security as illustrated by blocks 36, 37 and 38. At this stage in the process the type of security e.g., RSA, PGP, DES, etc. has already been pre-established using the two highest prime numbers of the customer account code/telephone number and numbers that are greater than the square root of the telephone number.

As illustrated at block 39, from the sub routine (see blocks 35, 37 and 38) and from the main routine (see block 34) the web server of the user is notified that the communications channel is no longer secure, i.e., HTTPS has been breached or compromised. The web server then prompts the user for the user name or public ID and the user sends the user name as illustrated by block 40. The web server then sends the encryption method, previously agreed upon, to the user or web browser for the user to execute and the user is prompted for the agreed upon account code e.g. telephone number as shown at blocks 41, 42. The account code or telephone number is stored on the user machine and the server and communication keys are created as illustrated at blocks 43, 44.

Messages are communicated back and forth between the user and the web server using the communication keys until the user changes the address of the URL being accessed by the user and the communication is determined to be completed (see blocks 45, 46).

Specific embodiments of novel methods for secure communication have been described for exemplification of the invention and are not intended to limit the invention to the specific embodiments illustrated. Numerous modifications and variations can be effectuated without deporting from the scope of the novel concepts of the invention. It is to be understood that no limitation with respect to the specific embodiment illustrated is intended or should be inferred. Accordingly, it is contemplated to cover by the applied claims any and all embodiments, modification, variations or equivalents that fall within the scope of the invention disclosed and claimed herein.

I claim:

1. A system for adding customer encoding on an established communications channel between a user having user name and a customer account code and a web server having the customer account code stored therein when the security of the communications channel is determined to be breached or compromised comprising;

communication equipment for establishing a first encoding system using a first encryption method between the user and the web server to establish an ongoing encrypted communication on the communications channel;

said communication equipment being operable for establishing communication keys for a second encryption method using an encryption algorithm different than the first encryption method, including the use of at least one of the customer user name and the customer account code, said communication equipment being capable of determining if the security of the first encoding system on the communications channel has been compromised or breached;

said communication equipment being capable of communicating an indication from the user that the user wishes to continue communicating with additional encoding using the second encryption method on the communications channel notwithstanding the breach or compromise;

said communication equipment being capable of communicating to the user and web server that additional customer encoding using the second encryption method is to be used in further communications on the communication channel;

said communication equipment then prompting the user to present the user name and then prompting the user for the customer account code;

said communication equipment then storing the customer account code on the user's machine followed by creating the communication keys by selecting two highest prime numbers from one of the customer account code number and the user name as a code number, excluding the code number itself and 1, and by making the communication keys equal to the two highest prime numbers but substituting a number equal to the code number ±n where the two highest prime numbers cannot be obtained from the code number or when one of the two prime numbers is less than the square root of the code number; and, said communication equipment continuing transfer of customer encoded messages using the communication keys and the second encryption method on the established communications channel until the ongoing encrypted communication is completed.

2. The system of claim 1, wherein the communication equipment prompts the user to provide an indication of whether the user wishes to continue the communication with the second encryption method in response to a determination that a compromise or breach has occurred.

3. The system of claim 1, wherein the first encoding system is HTTPS encryption.

4. The system of claim 1, wherein the second encryption method is selected from one of RSA, PGP, or DES algorithms.

5. The system of claim 1, wherein the account code number is a user's telephone number, except where two prime numbers in excess of the code number and the number 1 cannot be obtained from the code number.

6. The system of claim 5 wherein the two prime numbers each must be greater than the square root of the telephone number.

* * * * *